United States Patent [19]

Sudhakar

[11] Patent Number: 5,676,822
[45] Date of Patent: Oct. 14, 1997

[54] PROCESS FOR HYDRODEAROMATIZATION OF HYDROCARBON OILS USING CARBON SUPPORTED METAL SULFIDE CATALYSTS PROMOTED BY ZINC

[75] Inventor: Chakka Sudhakar, Wappingers Falls, N.Y.

[73] Assignee: Texaco Inc., White Plains, N.Y.

[21] Appl. No.: 401,374

[22] Filed: Mar. 9, 1995

[51] Int. Cl.[6] .................................................. C10G 45/46
[52] U.S. Cl. ............................ 208/143; 208/216 PP; 208/216 R; 208/254 H; 208/213; 585/266
[58] Field of Search .......................... 208/143, 216 PD, 208/216 R, 254 H, 213; 585/266

[56] References Cited

U.S. PATENT DOCUMENTS

| | | | |
|---|---|---|---|
| 3,546,103 | 12/1970 | Hamner et al. | 208/211 |
| 4,831,003 | 5/1989 | Lang et al. | 502/182 |
| 5,051,389 | 9/1991 | Lang et al. | 502/185 |
| 5,190,642 | 3/1993 | Wilson et al. | 208/254 R |
| 5,435,907 | 7/1995 | Sudhakar | 208/143 |
| 5,449,452 | 9/1995 | Sudhakar | 208/143 |
| 5,462,651 | 10/1995 | Sudhakar et al. | 208/143 |
| 5,472,595 | 12/1995 | Sudhakar et al. | 208/143 |
| 5,529,968 | 6/1996 | Sudhakar | 502/185 |
| 5,556,824 | 9/1996 | Sudhakar | 502/202 |

*Primary Examiner*—Helane Myers
*Attorney, Agent, or Firm*—Henry H. Gibson; P. G. Dilworth

[57] ABSTRACT

A process for treating a charge hydrocarbon oil containing undesired aromatic components, sulfur and nitrogen compounds, which comprises maintaining a bed of a sulfided catalyst comprising 0.1 to 15% by weight of one or more non-noble Group VIII metals; and from 1 to 50% by weight of tungsten and/or from 1 to 20% by weight or molybdenum or chromium, and 0.01 to 10% by weight of zinc, on an activated carbon support, passing a charge hydrocarbon feed in the presence of hydrogen into contact with said catalyst at hydrotreating conditions, thereby effecting hydrogenation, hydrodearomatization, hydrodesulfurization and hydrodenitrogenation of said charge hydrocarbon feed containing undesired aromatic components, sulfur and nitrogen, and forming a product stream of hydrocarbon containing a lesser concentration of undesired aromatic components, sulfur and nitrogen; and recovering said product stream of hydrocarbon containing a lesser concentration of undesired aromatic components, sulfur and nitrogen.

21 Claims, No Drawings

PROCESS FOR HYDRODEAROMATIZATION OF HYDROCARBON OILS USING CARBON SUPPORTED METAL SULFIDE CATALYSTS PROMOTED BY ZINC

FIELD OF THE INVENTION

This invention relates to a hydroprocessing catalyst composition comprising zinc, a Group VIB metal and a Group VIII metal, on a high surface area carbon support, useful after sulfiding for hydrodesulfurization (HDS), hydrodenitrogenation (HDN), hydrodeoxygenation (HDO), hydrodearomatization (HDAr), hydrogenation (HYD), hydrofining, hydrodemetallization, mild hydrocracking, and for other hydroprocessing reactions such as improving the hydrogen to carbon ratio, API gravity, color etc. of hydrocarbon oils. Promotion with zinc significantly improved the hydrodearomatization and hydrodenitrogenation activities of sulfided carbon supported Group VIB and Group VIII metal catalysts.

This invention also relates to a process for catalytic HDS, HDN and HDAr of gas oils, middle distillates and naphthas using the sulfided, zinc containing Group VIII and Group VIB metal catalysts supported on activated carbon, to produce low heteroatom and low aromatics containing hydrocarbon oils with substantially improved hydrogen to carbon ratio. Substantial HDS is also simultaneously accomplished along with HDAr and HDN over these catalysts, which is highly desirable.

With their high hydrogenation activities, these improved carbon supported catalysts will be valuable for hydroprocessing in general and for the production of low aromatic gasoline, kerosene and diesel fuel in particular. This invention will be useful for hydrotreating/hydroprocessing/hydrofining various hydrocarbon feedstocks such as naphthas, middle distillates, gas oils, vacuum gas oils and resids, derived from any source such as petroleum, coal, oil shale, tar sands, and oil sands. The catalysts and process of this invention will also be particularly useful for the hydrotreatment/hydroprocessing of hydrocarbon feeds before they are processed further by hydrocracking or by fluid catalytic cracking.

BACKGROUND OF THE INVENTION

Aromatic hydrocarbons in fuels such as gasoline or diesel oil represent a source of atmospheric pollution. The aromatic content of middle distillates may be as high as 85 vol %. An illustrative light straight run gas oil may for example be typically found to contain about 30 vol % aromatics. As environmental considerations become of greater concern, it is desirable to treat hydrocarbons such as naphthas and middle distillate hydrocarbons to decrease the content of undesirable aromatic components. Noble metal catalysts, which are excellent for aromatics saturation will quickly get poisoned by the sulfur and nitrogen compounds that are present in typical hydrocarbon feedstocks, and lose their hydrogenation activity in a short time. Therefore, noble metal catalysts can not be used for a one-step process for hydrodearomatizing these fuel feedstocks. Since the prior art hydroprocessing catalysts, typified by sulfided, alumina supported cobalt/nickel/molybdenum/tungsten, sometimes promoted by phosphorus or fluorine, do not have the catalytic activities necessary for producing a product having a very low aromatic content, it is desirable to find a hydrotreating catalyst with high aromatics saturation activity.

As the need to process heavier crudes containing large concentrations of sulfur and nitrogen compounds grows, hydroprocessing catalysts with improved HDN activity become more desirable. The adverse effects of nitrogen compounds on the catalytic activities of various catalysts for several different processes including HDS, hydrocracking, and fluid catalytic cracking are well known to those familiar with the art. A catalyst with high HDN and HDAr activity, if used for the hydrotreatment hydrocracker or fluid catalytic cracker feeds, would not only significantly improve the hydrocracking and fluid catalytic cracking operations, but also would facilitate the production of environmentally friendly and more valuable fuel products.

U.S. Pat. No. 1,965,956 is directed to the hydrogenation of aromatic compounds containing up to 0.5% by weight of sulfur to hydroaromatic compounds with a gas consisting substantially of hydrogen under a pressure of at least 100 atmospheres, at a temperature between 200° C. and 350° C., in the presence of a "mixed catalyst" comprising metal compounds of group 1, group 6 and group 8 of the periodic system, on a wide variety of catalyst supports including active charcoal. The catalysts of U.S. Pat. No. 1,965,956 can also contain "activating admixture" selected from compounds of elements of groups 2 to 5 and of group 7 of the periodic system.

U.S. Pat. No. 2,608,521 is specifically directed to an improved process for the desulfurization of "sulfur bearing" hydrocarbon oils using "sulfactive hydrogenation catalysts". The "sulfactive hydrogenation catalysts" of U.S. Pat. No. 2,608,521 can consist of "oxides or sulfides of the transition metals", with or without such stabilizers and promoters as the oxides and carbonates of a very large selection of metals, in combination with a large selection of various conventional supporting materials.

U.S. Pat. No. 3,367,862 is directed to desulfurization of heavy residual hydrocarbons by hydrolysis with water in the presence of catalyst on a charcoal base.

U.S. Pat. No. 3,546,103 is directed to the removal of metals and coke from hydrocarbon resids by use of, as pre-catalyst, metals of Group IIB or Group VIB plus Group VIII, on charcoal.

U.S. Pat. No. 3,725,303 is directed to treating of aqueous solutions of oxy-sulfur compounds (such as sodium thiosulfate) by use of a catalyst containing molybdenum sulfide and cobalt sulfide on a carbon support.

U.S. Pat. No. 3,812,028 is directed specifically to "hydrotreating" fossil fuels containing polynuclear aromatics such as asphaltenes, for converting the components boiling above 1000° F. to products boiling below 1,000° F. (this is actually hydrocracking), by the use of Group VI and/or Group VIII metals on carbon, at a hydrogen partial pressure in excess of 2,200 psig and at a temperature between 750° F. and 850° F.

U.S. Pat. No. 3,997,473 (and its divisional U.S. Pat. No. 4,032,435) is directed to hydrodesulfurization of petroleum residues by use of a catalyst comprising cobalt/nickel/molybdenum/tungsten on a carbon support, the carbon support being characterized by an average pore radius of at least 25 Angstroms and a BET Surface area of 200–800 m²/g. The catalyst of these patents has a loading of Group VIB metal "of at least 10 and up to about 20 weight percent expressed as metal oxide based on the weight of the catalyst support."

U.S. Pat. No. 4,082,652 is directed to treatment of heavy oils, to effect hydrodesulfurization by use of a molybdenum/nickel or molybdenum/cobalt on carbon catalyst. The catalyst preparation requires that the molybdenum be deposited first, then sulfided, and only then that the nickel or cobalt be added.

U.S. Pat. No. 4,176,051 is directed to a process for catalytically hydrocracking a heavy hydrocarbon oil, wherein the heavy hydrocarbon oil is slurried with a particulate catalyst mass comprising aluminum compound coated coal and/or coke particles which may also be coated with a cobalt and/or a molybdenum compound, and then reacted with hydrogen.

U.S. Pat. No. 4,313,852 is directed to hydrotreating, particularly of coal liquids, in the presence of a sulfided molybdenum or tungsten on active carbon, with or without a second metallic component, in which catalysts the metal sulfides exist substantially completely on the outer surface of the active carbon support. The carbon supported catalyst preparation according to U.S. Pat. No. 4,313,852 must involve direct deposition of metal sulfides on the carbon support and their subsequent reduction to lower valent sulfides.

In U.S. 4,595,672 there is disclosed a process for preparing a supported, self-promoted hydrotreating catalyst which comprises compositing a porous inorganic refractory oxide support with a water soluble catalyst precursor salt characterized by $(ML)(Mo_yW_{1-y}O_4)$ wherein M comprises one or more divalent promoter metals selected from the group consisting of Mn, Fe, Co, Ni, Cu, Zn and mixtures thereof, wherein y is any value ranging from 0 to 1 and wherein L is one or more neutral, nitrogen-containing ligands at least one of which is a chelating polydentate ligand.

U.S. Patent No. 4,716,139 discloses a process for preparing a catalyst comprising an amorphous metal sulfide, (i) a metal selected from the group consisting of Mo, W and a mixture thereof and (ii) at least one promoter metal selected from the group consisting of Fe, Ni, Co, Mn, Zn, Co and mixtures thereof.

In U.S. Pat. No. 4,755,496 there is disclosed a catalyst composition obtained by compositing an inorganic oxide support with one or more precursor salts and heating said composite at an elevated temperature of at least about 150° C. in the presence of sulfur and under oxygen-free conditions for a time sufficient to form a catalyst, wherein said precursor salt contains a thiometallate anion of Mo, W or a mixture thereof and one or more divalent promoter metal cations which are chelated by at least one neutral, nitrogen-containing polydentate ligand, said divalent promoter metal cations being selected from the group consisting of cations of Ni, Co, Zn, Cu and mixtures thereof.

U.S. Pat. No. 4,831,003 is directed to a catalyst composition, useful in hydrotreating processes, prepared by depositing a compound of a metal of Group IIB, IVB, IVA, VA, VIA, VIIA, or VIIIA onto a carbon support which is formed simultaneously with the deposition by partial combustion of an unsaturated hydrocarbon. The deposited metal is thereafter converted to an oxide or sulfide.

U.S. Patent No. 5,010,049 discloses a composition comprising a support and a catalyst having an overall stoichiometry of $M_{2x}A_{1-x}S_2$ wherein $0.001 \leq x \leq 0.5$, and wherein M is at least one member selected from the group consisting of Cu, Fe, Ni, Cu, Zn, Mn and Ru, and A is either Mo or W, wherein said catalyst is obtained by (i) mixing elemental M, elemental A and elemental S in a relative amount of moles of M and (1-x S/2) moles of A per mole of S, and heating the mixture in the absence of $O_2$ to a temperature of from 200° C. to 800° C.

U.S. Pat. No. 5,051,389 is directed to a method for preparing a catalyst composition for hydroconversion processes wherein the catalyst composition is formed by depositing one or more metal and/or metal compounds from vapor phase, at elevated temperatures, onto a preformed carbon support which has maximum dimension in any direction of about 50 Angstroms to about 5,000 Angstroms. The catalysts made according to U.S. Pat. No. 5,051,389 have to be added to or combined with the carbonaceous material to be hydrotreated in only 50 to 5,000 parts per million concentration, for the hydroconversion process to take place (one-pass application).

In U.S. Pat. No. 5,190,642 there is disclosed a hydrotreating catalyst and a method for making it which comprises a peptized alumina support containing a Group IVB metal compound and a soluble Group VIII metal compound, neutralizing said aqueous acidic solution containing the peptized alumina with an aqueous solution containing a basic compound and a soluble Group VIB metal.

There is a continuing need in the art for catalysts which demonstrate improved hydrodearomatization and HDN of hydrocarbon oils. It would be extremely valuable if a catalyst which performed better with respect to hydrodearomatization and HDN were capable of simultaneously eliminating sulfur.

SUMMARY OF THE INVENTION

In accordance with certain of its aspects, this invention is directed to a process for treating a charge hydrocarbon containing undesired aromatic components, sulfur and nitrogen compounds which comprises maintaining a bed of sulfided catalyst comprising zinc, one or more non-noble metals of Group VIII selected from nickel, cobalt and iron, and one or more metals of Group VIB on a carbon support, passing a charge hydrocarbon in the presence of hydrogen into contact with said sulfided catalyst containing zinc, one or more non-noble metals of Group VIII and one or more metals of Group VIB on a carbon support, at hydrotreating conditions thereby effecting hydrogenation, hydrodearomatization, hydrodesulfurization and hydrodenitrogenation of said charge hydrocarbon containing undesired aromatic components, sulfur and nitrogen compounds, forming a product stream of hydrocarbon containing lesser concentrations of undesired aromatic components, sulfur and nitrogen; and recovering said product stream of hydrocarbon containing lesser concentrations of undesired aromatic components, sulfur and nitrogen.

DESCRIPTION OF THE INVENTION

The charge hydrocarbons which may be treated by the process of this invention include those which are commonly designated as naphthas, middle distillates or other heavier hydrocarbon feedstocks such as gas oils, vacuum gas oils, residua, shale oils, coal liquids, sand oils, etc., and mixtures thereof. Naphthas, middle distillates and gas oils produced from fluid catalytic crackers, steam crackers and delayed cokers, which are sometimes called as cracked feedstocks may also be included as charge hydrocarbons for this invention. Typically naphthas may have an initial boiling point (IBP) of at least about 70° F. and typically 80° F.–200° F. by ASTM distillation #D86. The charge middle distillates may have an IBP of at least about 300° F., and commonly about 300° F.–480° F.

These charge hydrocarbons may include light, full range or heavy naphtha (IBP of 70° F.–200° F.), kerosene (IBP of 300° F.–340° F.), light gas oil (IBP of 340° F.–480° F.), heavy gas oil, vacuum gas oils, residua etc.

Many middle distillates may have an aromatic content as high as 80 vol %, typically 20 vol %–50 vol %, say 25 vol %–40 vol %. In addition to the undesired aromatic components, they may contain other undesirables such as sulfur (0.1 wt %–5 wt %, typically 1 wt %–4 wt %) and nitrogen (10–5,000 wppm, typically 0.001%–0.2 wt %). Heavier feeds may contain substantially more nitrogen.

A typical charge which may be treated by the process of this invention may be a light atmospheric gas oil (LAGO) having the following properties:

TABLE

| Property | Value |
| --- | --- |
| API Gravity | 32° |
| ASTM D86 Distillation: | |
| IBP °C. | 197 |
| 10% °C. | 263 |
| 50% °C. | 299 |
| 90% °C. | 344 |
| EP (End Point) °C. | 360 |
| Sulfur wt % | 0.71 |
| Nitrogen wppm | 500 |
| Aromatics wt % (ASTM D-5186) | 32 |

In practice of the process of this invention, the charge may be admitted to the catalyst bed at about 200° C.–450° C., preferably at 300° C.–410° C., say about 380° C., and 200–3,000 psig, preferably 400–2,500 psig, say 1,500 psig. Hydrogen is admitted at a flow rate of 200–10,000 SCFB (standard cubic feet per barrel), preferably 1,000–6,000 SCFB, say about 4,000 SCFB. Gas mixtures wherein hydrogen is the major component, say higher than about 60% by volume, may be employed instead of pure hydrogen gas. LHSV (liquid hourly space velocity) based on catalyst volume may be 0.1–10, preferably 0.5–4, say about 2.5. The process of the present invention can be effected in any type of reactor system such as fixed bed reactor system, ebullated bed reactor system, fluidized bed reactor system, moving bed, or slurry reactor system. For naphthas, gas oils, and middle distillates, it is preferred to use extrudates, pellets, spheres or granules of the catalyst in a fixed bed reactor system.

The supported catalyst of this invention is preferably prepared on an activated carbon support. All carbons with B.E.T. surface areas of generally more than 600m$^2$/g, derived from any raw material such as coal, wood, peat, lignite, coconut shell, olive pits, synthetic polymers, coke, petroleum pitch, coal tar pitch, etc., are suitable as catalyst supports for the catalysts of the present invention. Carbon is generally characterized as "activated" if it contains an intricate network of internal porosity arising from the activation process.

The activated carbon support used for making the catalysts of this invention can exist in any physical form including, but not limited to powder, granules, pellets, spheres, fibers, monolith, or extrudates. It may contain a small concentration of phosphorus of the order of about 2 wt. % or less, as a consequence of its manufacturing process. It may also contain one or more refractory inorganic oxides as minor components which may arise as a result of the carbon's inherent composition (ash), or as a result of using some binding materials for forming (or shaping) the carbon material, total of these being less than about 30 wt. %.

Expressed as elemental zinc, zinc can exist in an amount of 0.01 to 10% by weight of the total catalyst and preferably about 0.1 to 5% by weight. In general, any known inorganic, organic or organometallic zinc compounds can be used as precursors for zinc in the final catalyst. Suitable zinc compounds include, but are not limited to zinc nitrate, zinc sulfate, zinc acetate, zinc tetrafluoroborate, and zinc chloride. The Total Surface Area (Brunauer-Emmett-Teller, BET) of the carbon support should be at least about 600m$^2$/g, and typically between 600 m$^2$/g and 2,000 m$^2$/g. The preferred range is between 600 and 1600 m$^2$/g. Within these parameters 800–1500 m$^2$/g. is a particularly useful range and the examples demonstrate 1100 to 1300 m$^2$/g. The Total Pore Volume (TPV) of the carbon support for nitrogen is at least about 0.3 cc/g, preferably 0.4–1.2 cc/g, say 0.8 cc/g. The Average Pore Diameter by nitrogen physisorption, is in the range of 12–100 Angstroms, preferably 16–50 Angstroms, say 25 Å. Preferably 20–80% of the total pore volume of the carbon support should exist in pores in the mesopore range (20–500 Å diameter).

Suitable commercially available carbon pellets, granules, or extrudates which may be used as catalyst supports in fixed beds in the practice of the process of this invention may include:

A. A commercially available activated carbon known by the brand name, Nuchar BX-7530 carbon obtained from the Westvaco Company as ⅛" pellets, having a Brunauer-Emmett-Teller (BET) surface area of 1128 m$^2$/g, a nitrogen pore volume (TPV) of 0.82 cc/g (for nitrogen), Average Pore Diameter estimated using the Wheeler equation Average Pore Diameter (Å)=[40,000×TPV (cc/g)]/Surface Area (m$^2$/g) of 29.2 Å calculated from nitrogen physisorption data, an apparent bulk density of 0.37 g/cc and an ash content of less than 7 wt %.

B. The Norit RX carbon (of the Norit Company) acid-washed extrudate (0.8 mm diameter) having a surface area (BET) of 1474 m$^2$/g, a TPV of 0.79 cc/g (for nitrogen), Average Pore Diameter of 21.4 Å, an apparent bulk density of 0.41 g/cc and an ash content of less than 4 wt %.

C. The Norit R carbon (of the Norit Company) extrudate (3 mm diameter) having a surface area (BET) of 1217 m$^2$/g, a TPV of 0.67 cc/g (for nitrogen), Average Pore Diameter of 22 Å and an apparent bulk density of 0.41 g/cc.

The desired hydrogenation, hydrodearomatization, HDS and HDN of hydrocarbons according to this invention is accomplished by use of a catalyst prepared from a carbon support characterized by a BET surface area of at least about 600 m$^2$/g, by a Total Pore Volume of at least about 0.3 cc/g, and by an average Pore Diameter of at least 12 Å which has deposited thereon 1–50 wt % of Group VIB metal, 0.1–15 wt % of non-noble Group VIII metal, and 0.01–10 wt % zinc, based on the final catalyst weight. The catalysts of the present invention can also contain additional promoters such as phosphorus, boron or fluoride, at 0.01% to 4% by weight, calculated as elemental phosphorus, boron or fluorine respectively, based on the total catalyst weight.

The catalytic metals may be deposited on the carbon, in the form of inorganic, organic or organometallic compounds of the metals, either sequentially or simultaneously, by various processes known in the art including incipient wetness impregnation, equilibrium adsorption etc., from aqueous or non-aqueous media, or from vapor phase using volatile compounds of the metals. The catalysts can also be prepared by solid state synthesis techniques such as, for example, grinding together the support and the metal compounds in a single step or in multiple steps, with suitable heat treatments.

It is to be noted that in the as-prepared catalysts, Cr, Mo, W, Ni, Fe, Co, and Zn exist as oxides or as partially decomposed metal compounds which are precursors to the oxides. All the metals and the zinc promoter can be deposited in any order on the carrier, either in a single step or in multiple steps via solid state techniques, gas phase, or solution impregnation from aqueous or non-aqueous media, with suitable heat treatment in between.

The chromium and/or molybdenum together can constitute from 1 to 20% by weight, expressed as elemental chromium or molybdenum, based on the final catalyst weight. The preferred range is 5–18% by wt., particularly from about 10–15%, say about 12% by weight. The tungsten can constitute 1–50% by wt., preferably 10–45% by weight, particularly from about 30–40%, say about 33% by wt, expressed as elemental tungsten, based on the final catalyst weight. Tungsten is the preferred Group VIB metal. More than one Group VIB metals can be present in the catalyst.

The non-noble Group VIII metal may preferably be one or more metals selected from cobalt, iron or nickel. The final catalyst can constitute 0.1–15% by weight selected from one or more of nickel, cobalt and iron. The preferred range for one or more metals selected from nickel, iron or cobalt is from 2 to 12% by wt., particularly from about 5 to 9%, say about 7% by wt., expressed as elemental cobalt, iron or nickel, based on final catalyst weight. Nickel is the preferred non-noble Group VIII metal.

The Group VIB metal may be loaded onto the catalyst support from a preferably aqueous solution of ammonium metatungstate for tungsten, and ammonium heptamolybdate for molybdenum. The Group VIII non-noble metal may be loaded onto the catalyst support preferably from an aqueous solution of nickel nitrate hexahydrate.

Although the Group VIB and Group VIII metals and zinc may be deposited on the catalyst support in any order, either in a single step or in multiple steps, it is preferable to deposit the Group VIB metal first, and then zinc along with the Group VIII metal in the final step.

In a preferred embodiment, the carbon pellet support is contacted with an aqueous solution of a salt of the Group VIB metal, preferably ammonium metatungstate, $(NH_4)_6H_2W_{12}O_{40}$ in an amount to fill the pores to incipient wetness. The support bearing the Group VIB metal is typically allowed to stand at room temperature for 0.5–4 hours, say 2 hours, and then heated in air or inert atmosphere at a rate of 0.3° C./min to 115° C., maintained at that temperature for 12–48 hours, say 24 hours, and then cooled to room temperature over 2–6 hours, say 3 hours. Temperatures higher than 115° C. may be employed, but are limited to about 500° C. Multiple impregnation may be employed to prepare catalysts with desired Group VIB metal loading.

Thereafter the support bearing the Group VIB metal is contacted with an aqueous solution containing the non-noble Group VIII metal, preferably nickel nitrate, and zinc, preferably zinc nitrate, in an amount to fill the pores to incipient wetness. The support bearing Group VIB metal, Group VIII metal, and zinc is typically allowed to stand at room temperature for 0.5–4 hours, say 2 hours, and then heated in air or inert atmosphere, at a rate of 0.3° C./min to 115° C., maintained at that temperature for 12–48 hours, say 24 hours and then cooled to room temperature over 2–6 hours, say 3 hours. Temperatures higher than 115° C. may be employed, but are limited to about 500° C. Multiple impregnations may be employed to prepare catalysts with desired Group VIII metal and zinc loadings.

The catalyst so prepared contains 1–50 wt %, preferably 5–18 wt %, say 12 wt %, of molybdenum or chromium of the Group VIB (measured as metal); 0.1–15 wt %, preferably 2–12 wt %, say 7 wt %, of Group VIII metal (measured as metal); and 0.01–10 wt %, preferably 0.1–5 wt %, and particularly from about 2–4% by wt., say 3 wt % zinc (measured as metal). When the VIB metal is the preferred tungsten, it may be present in amount of 1–50 wt %, preferably. 10–45 wt %, say 33 wt %.

In a typical process according to the present invention, the catalyst, bearing zinc, Group VIB and non-noble Group VIII metals, is loaded into a hydrotreating reactor and sulfided in situ to convert the zinc, Group VIB, and Group VIII metal compounds to their respective sulfides to a significant extent.

The catalyst sulfiding can be accomplished using any method known in the art such as for example, by heating it in a stream of hydrogen sulfide in hydrogen or by flowing an easily decomposable sulfur compound such as carbon disulfide or dimethyl disulfide in a hydrocarbon solvent over the catalyst at elevated temperatures up to, but not limited to 450° C. at atmospheric or higher pressures, in the presence of hydrogen gas for 2–24 hours, say 3 hours.

Alternatively, the catalyst sulfiding can also be effected by the sulfur compounds present in the hydrocarbon charge itself which is being hydrotreated. The catalyst can also be presulfided outside the reactor, suitably passivated and then loaded into the reactor. After sulfiding, the hydrocarbon charge is passed through the catalyst bed together with hydrogen gas at pressures ranging from 200–3000 psi and temperatures ranging from 200°–450° C. at liquid hourly space velocities (LHSV) ranging from 0.1 to 10. Pure hydrogen gas or recycle gas containing largely hydrogen can be used at flow rates ranging from 200–10000 SCFB.

Ex-situ sulfiding can be accomplished using any of the known techniques described in literature. If sufficient amount of sulfur is incorporated into the catalyst using one of these ex-situ presulfiding techniques, activation of the catalyst might be accomplished by heating the catalyst in hydrogen flow in the reactor itself.

Practice of the process of this invention can be carried out by passing the charge hydrocarbon into contact with the sulfided catalyst at 200° C.–450° C., and particularly from about 350°–400° C., say 380° C. and 200–3,000 psig, and particularly from about 1000–1600 psig, say 1,500 psig, at LHSV (based on catalyst volume) of 0.1–10, say 2.0, with hydrogen gas flow rates of 200–10,000, say 4,000 SCFB. Gas mixtures wherein hydrogen is the major component, say higher than about 60% by volume, may be employed instead of pure hydrogen gas.

During hydrodearomatization, it is found that the aromatic content may be decreased from a charge content of 25–40 wt %, say 32 wt %, down to a product content of 10–16 wt %, say 13 wt %. In the case for example of a light atmospheric gas oil (LAGO) containing 32 wt % aromatics, this content may be reduced to approximately 15 wt % in a typical operation. Most of the sulfur and nitrogen present in the hydrocarbon charge may also be eliminated during the process of the present invention.

A particularly advantageous application of the catalyst and process of the present invention is for the hydroprocessing of the hydrocracker charge or the fluid catalytic cracker charge. When the hydrocracker charge or the fluid catalytic cracker charge is hydroprocessed using the catalysts and process of the present invention, products containing very low levels of sulfur and nitrogen are achieved along with significantly reduced aromatics concentration.

Practice of the process of this invention will be apparent to those skilled in the art from the following wherein all parts are parts by weight unless otherwise stated. An asterisk (*) indicates a control example. The activated carbon support used to prepare the catalysts in the following examples is the commercially available activated carbon known by the brand name Norit RX carbon (of the Norit Company) acid-washed extrudate (0.8 mm diameter) having a surface area (BET) of 1474 m²/g, a TPV of 0.79 cc/g (for nitrogen). Average Pore Diameter estimated using the Wheeler equation Average Pore Diameter (Å)=[40,000×TPV (cc/g)]/ Surface Area (m²/g) of 21.4 Å calculated from nitrogen physisorption data, an apparent bulk density of 0.41 g/cc and an ash content of less than 4 wt %.

EXAMPLE 1

PREPARATION OF (Ni+Zn)-Mo/Carbon CATALYST (CATALYST C1)

Step 1:

24.5 parts of ammonium heptamolybdate (AHM) was dissolved in 58 parts of deionized water. 80 parts of the support carbon was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours, and was cooled slowly to room temperature in 3 hours.

Step 2:

One half of the total material from Step 1 above was impregnated to incipient wetness with a solution made up of 13.8 parts of nickel (II) nitrate hexahydrate (Ni nitrate) and 8.3 parts of zinc (II) nitrate hexahydrate (Zn nitrate) in 17 parts of deionized water. The impregnated material was heat treated in the same way as in Step 1.

The resulting material is referred to as Catalyst C1. If all the AHM, Ni nitrate, and Zn nitrate were decomposed to the respective oxides, then Catalyst C1 would contain nominally 12% by weight Mo, 5% by weight Ni, and 3% by weight zinc, based on the final catalyst weight.

EXAMPLE 2

(CONTROL)

PREPARATION OF Ni-Mo/Carbon CATALYST (CATALYST C2*)

Step 1:

24.5 parts of AHM was dissolved in 60 parts of deionized water. 80 parts of the carbon was impregnated with this solution to incipient wetness. The impregnated material was left at room temperature with occasional stirring for 2 hours. It was then heated slowly at a rate of 0.3° C./min to 115° C. in an oven in air, left at that temperature for 24 hours and cooled slowly to room temperature in 3 hours.

Step 2:

The material from Step 1 above was impregnated to incipient wetness with a solution made up of 44.1 parts of nickel (II) nitrate hexahydrate, (Ni nitrate), in 30 parts of deionized water. The impregnated material was heat treated in the same way as in Step 1.

The resulting material is referred to as Catalyst C2*. If all the AHM and Ni nitrate were decomposed to the respective oxides, then Catalyst C1 would contain nominally 12% by weight Mo and 8% by weight Ni, based on the final catalyst weight.

EXAMPLE 3

(CONTROL)

PREPARATION OF Ni-Mo/Carbon CATALYST (CATALYST C3*)

Step 1:

24.5 parts of AHM was dissolved in 60 parts of deionized water. 80 parts of the carbon was impregnated with this solution to incipient wetness. The impregnated material was left at room temperature with occasional stirring for 2 hours. It was then heated slowly at a rate of 0.3° C./min to 115° C. in an oven in air, left at that temperature for 24 hours and cooled slowly to room temperature in 3 hours.

Step 2:

67% of the total product material from Step 1 above was impregnated to incipient wetness with a solution made up of 18 parts of Ni nitrate in 30.5 parts of deionized water. The impregnated material was heat treated in the same way as in Step 1.

The resulting material is referred to as Catalyst C3*. If all the AHM and Ni nitrate were decomposed to the respective oxides, Catalyst C3* would contain nominally 12% by weight Mo and 5% by weight Ni, based on the final catalyst weight.

EXAMPLE 4

PREPARATION OF (Ni+Zn)-(W+B)/Carbon CATALYST (CATALYST C4)

Step 1:

26.8 parts of ammonium metatungstate, $(NH_4)_6H_2W_{12}O_{40}$, was dissolved in 22.5 parts of deionized water together with 2.25 parts of ammonium tetraborate tetrahydrate. 30 parts of Carbon support was impregnated with this solution to incipient wetness. The impregnated material was left at room temperature with occasional stirring for 2 hours. It was then heated slowly at a rate of 0.3° C./min to 130° C. in an oven in air, was left at that temperature for 24 hours and was cooled slowly to room temperature in 3 hours.

Step 2:

The material from Step 1 above was impregnated to incipient wetness with a solution made up of 14.6 parts of nickel (II) nitrate hexahydrate (Ni nitrate) and 5.8 parts of zinc (II) nitrate hexahydrate (Zn nitrate) in 15.5 parts of deionized water. The impregnated material was heat treated in the same way as in Step 1.

The resulting material is referred to as Catalyst C4. If all the ammonium metatungstate, ammonium tetraborate, Ni nitrate, and Zn nitrate were decomposed to the respective oxides, then Catalyst C4 would contain nominally 33% by weight W, 0.6% by weight boron, 5% by weight Ni, and 2% by weight zinc, based on the final catalyst weight.

EXAMPLE 5

(CONTROL)

PREPARATION OF Ni-(W+B)/Carbon CATALYST (CATALYST C5*)

Step 1:

26.8 parts of ammonium metatungstate, $(NH_4)_6H_2W_{12}O_{40}$, was dissolved in 22.5 parts of deionized water together with 2.25 parts of ammonium tetraborate tetrahydrate. 30 parts of Carbon support was impregnated with this solution to incipient wetness. The impregnated material was left at room temperature with occasional stirring for 2 hours. It was then heated slowly at a rate of 0.3° C./min to 130° C. in an oven in air, was left at that temperature for 24 hours and was cooled slowly to room temperature in 3 hours.

Step 2:

The material from Step 1 above was impregnated to incipient wetness with a solution made up of 17.5 parts of nickel (II) nitrate hexahydrate (Ni nitrate) in 16 parts of deionized water. The impregnated material was heat treated in the same way as in Step 1.

The resulting material is referred to as Catalyst C5*. If all the ammonium metatungstate, ammonium tetraborate and Ni nitrate were decomposed to the respective oxides, then Catalyst C5* would contain nominally 33% by weight W, 0.6% by weight boron, and 6% by weight Ni, based on the final catalyst weight.

TABLE 1

Summary of Catalyst Examples

| CATALYST | CATALYST DESCRIPTION | wt. % Mo | wt. % W | wt. % Ni | wt. % B | wt. % Zn |
|---|---|---|---|---|---|---|
| C1 | (Ni + Zn)—Mo/Carbon | 12 | 0 | 5 | 0 | 3 |
| C2* | Ni—Mo/Carbon | 12 | 0 | 8 | 0 | 0 |
| C3* | Ni—Mo/Carbon | 12 | 0 | 5 | 0 | 0 |
| C4 | (Ni + Zn)—(W + B)/Carbon | 0 | 33 | 5 | 0.6 | 2 |
| C5* | Ni—(W + B)/Carbon | 0 | 33 | 6 | 0.6 | 0 |

EVALUATION OF CATALYSTS

Catalysts C1, C2*, C3*, C4, and C5* were evaluated for their Hydrodesulfurization (HDS), Hydrodenitrogenation (HDN) and Hydrodearomatization (HDAr) activities in a standard hydrotreating reactor system using techniques well-known to those familiar with the art. In a typical experiment, 20 cc of the catalyst is loaded into the hydrotreating reactor of 12 mm ID and 40 cm long. After purging off of oxygen from the reactor, 100 cc/min of a sulfiding gas, 10% $H_2S$ in hydrogen, is passed over the catalyst for 15 minutes at room temperature at 1 atmosphere pressure. With the sulfiding gas flowing, the temperature of the reactor is increased at 3° C./min to 350° C. and kept at the sulfiding temperature of 350° C. for 2 hours. The temperature of the reactor is then changed to the reaction temperature, the sulfiding gas still flowing. At this point, a back pressure of about 100–400 psig is applied to the reactor and the liquid feed flow is started at the desired rate. Once the liquid had passed beyond the catalyst bed, the flow of the sulfiding gas is cut off, the flow of hydrogen started at the desired rate and the reactor pressure increased to the desired value. The actual hydrotreating reaction is considered to have started at this point of time.

After about 20 hours on stream, the liquid product samples were collected and were sparged with hydrogen gas to remove the dissolved $H_2S$ and $NH_3$ gases before they were analyzed for their sulfur, nitrogen and aromatics contents. The extent of sulfur removal (%HDS), nitrogen removal (%HDN) and aromatics saturation (%HDAr) are calculated from these analyses.

The liquid feed used for all the experiments presented here was a light atmospheric gas oil (LAGO) having the properties and composition given in Table 2. It should be mentioned here that even though LAGO was used as the feed in the examples presented here, the catalysts of the present invention are anticipated to be applicable for processing various hydrocarbon feed fractions ranging from naphthas and middle distillates to vacuum gas oils and resids.

TABLE 2

Properties of LAGO

| API Gravity | 32° |
|---|---|
| IBP (ASTM #D86) | 197° C. |
| 10% | 263° C. |
| 50% | 299° C. |
| 90% | 344° C. |
| FBP | 360° C. |
| Sulfur, wt % | 0.71 |
| Nitrogen, ppm wt. | 500 |
| Aromatics (wt %) (ASTM #5186) | 32 |

The Sulfur and Nitrogen concentrations of the feed and product samples were determined by X-ray fluorescence (XRF), ASTM# D2622 and Chemiluminescence techniques respectively. The weight percent aromatics in the feed as well as in the product samples were measured by Supercritical Fluid Chromatography (SFC), ASTM #5186.

The particular three sets of reaction conditions namely, [340° C. temperature, 800 psig total pressure, LHSV=2.0, and $H_2$ flow rate =2000 SCFB], [380° C. temperature, 1500 psig total pressure, LHSV=1.0, and $H_2$ flow=4000 SCFB], and [385° C. temperature, 1500 psig total pressure, LHSV= 2.0, and $H_2$ flow=4000 SCFB], employed in the present experimental evaluations were chosen in such a way that only partial HDS and HDN under the first set of conditions, and partial HDAr under the second and third set of conditions occur. This helps us to compare the HDS, HDN and HDAr activities of different catalysts at identical reaction conditions, in order to rank them.

Table 3 presents the results of catalyst evaluations under the first set of reaction conditions, for the hydroprocessing of the LAGO, the properties of which are given in Table 2. Presented in Table 3, in the order of the number of column, are the Run#, catalyst, catalyst description, % HDS, and % HDN. The results presented are on EQUAL CATALYST VOLUME basis. The liquid hourly space velocity (LHSV), process temperature, total pressure and rate of hydrogen flow for all the experiments were 2.0 $hr^{-1}$, 340° C., 800 psig and 2000 SCFB, respectively.

TABLE 3

Results of Catalyst Evaluations

| Run# | Catalyst | Catalyst Description | wt % Zn | % HDS | % HDN |
|---|---|---|---|---|---|
| 1 | C1 | (Ni + Zn)—Mo/Carbon | 3 | 90.6 | 48.6 |
| 2 | C2* | Ni—Mo/Carbon | 0 | 91.8 | 45.8 |
| 3 | C3* | Ni—Mo/Carbon | 0 | 92.8 | 46.2 |
| 4 | C4 | (Ni + Zn)—(W + B)/carbon | 2 | 91.1 | 53.4 |
| 5 | C5* | Ni—(W + B)/Carbon | 0 | N.D. | N.D. |

N.D. = Not Determined

Table 4 presents the results of catalyst evaluation under the second set of reaction conditions, for the hydroprocessing of the LAGO the properties of which are given in Table 2. Presented in Table 4, in the order of the number of column, are the catalyst, catalyst description, wt. % Zn in the catalyst, % HDS, % HDN, % HDAr, and the first order rate constant for HDAr. The results presented are on EQUAL CATALYST VOLUME basis. The liquid hourly space velocity (LHSV), process temperature, total pressure and rate of hydrogen flow for all the experiments in table 4 were 1.0 $hr^{-1}$, 380° C., 1500 psig and 4000 SCFB respectively.

TABLE 4

Results of Catalyst Evaluations

| Catalyst | Catalyst Description | Wt % Zn Added | % HDS | % HDN | % HDAr | $k_1$(HDAr) |
|---|---|---|---|---|---|---|
| C1 | (Ni + Zn)—Mo/Carbon | 3 | 99.7 | 99.4 | 62.8 | 0.99 |
| C2* | Ni—Mo/Carbon | None | 99.9 | 99.8 | 51.9 | 0.73 |
| C3* | Ni—Mo/Carbon | None | N.D. | 100 | 52.2 | 0.74 |

N.D. = Not Determined

Table 5 presents the results of catalyst evaluation under the third set of reaction conditions, for the hydroprocessing of the LAGO the properties of which are given in Table 2. Presented in Table 5, in the order of the number of column, are the catalyst, catalyst description, wt. % Zn in the catalyst, % HDS, % HDN, % HDAr, and the first order rate constant for HDAr. The results presented are on EQUAL CATALYST VOLUME basis. The liquid hourly space velocity (LHSV), process temperature, total pressure and rate of hydrogen flow for all the experiments in table 5 were 2.0 hr$^{-1}$, 385° C., 1500 psig and 4000 SCFB respectively.

TABLE 5

Results of Catalyst Evaluations

| Catalyst | Catalyst Description | Wt % Zn Added | % HDS | % HDN | % HDAr | $k_1$(HDAr) |
|---|---|---|---|---|---|---|
| C4 | (Ni + Zn)—(W + B)/Carbon | 2 | 99.5 | 99.0 | 58.0 | 1.74 |
| C5* | Ni—(W + B)/Carbon | None | 99.8 | 99.0 | 53.9 | 1.55 |

The following observations/conclusions can be made from the data presented in Tables 3, 4 and 5.

(a) The zinc promoted carbon supported catalysts of the present invention are clearly significantly more active for the Hydrodearomatization of LAGO than the carbon supported catalysts that do not contain zinc. From the first order rate constant values for HDAr, promoting the catalyst with as little as 3 wt % zinc improved the HDAr activity of the catalyst by as much as 35%. An improvement of this magnitude is not possible with any teachings in the art, is quite unexpected and is unattainable without the instant inventive concept.

(b) Zinc promotion seems to have improved the HDN activity of the catalysts, though not very significantly.

(c) Under the reaction conditions that are necessary to effect significant aromatics saturation, both the HDS and HDN conversions approach 100%.

What is claimed:

1. A process for treating a charge hydrocarbon oil containing undesired aromatic components, sulfur and nitrogen compounds, which comprises:

maintaining a bed of a sulfided catalyst comprising 0.1 to 15% by weight of one or more non-noble Group VIII metals selected from nickel, cobalt and iron; and from 1 to 50% by weight of tungsten and/or from 1 to 20% by weight or molybdenum or chromium, and 0.01 to 10% by weight of zinc, on an activated carbon support, wherein the activated carbon support is characterized by a B.E.T. surface area of 600 to 2000 m$^2$/g, a pore volume for nitrogen of at least 0.3 cc/g and an average pore diameter of 12 to 100 Angstroms;

passing a charge hydrocarbon feed in the presence of a gas selected from pure hydrogen and a gas mixture comprising greater than 60% by volume pure hydrogen into contact with said catalyst at hydrotreating conditions of 200° C.–450° C., a pressure of 200–3000 psig, a liquid hourly space velocity of 0.1–10 LHSV and a hydrogen feed rate of 200–10,000 SCFB, thereby effecting hydrogenation, hydrodearomatization, hydrodesulfurization and hydrodenitrogenation of said charge hydrocarbon feed containing undesired aromatic components, sulfur and nitrogen compounds, and forming a product stream of hydrocarbon containing a lesser concentration of undesired aromatic components, sulfur and nitrogen; and recovering said product stream of hydrocarbon containing a lesser concentration of undesired aromatic components, sulfur and nitrogen.

2. The process of claim 1 wherein the hydrocarbon oil charge is selected from light, full range or heavy naphthas, middle distillates, gas oils, vacuum gas oils and residua, derived from petroleum, coal, shale, tar sands, and oil sands, and mixtures thereof.

3. The process of treating a charge hydrocarbon containing undesired aromatic components, sulfur and nitrogen compounds, as claimed in claim 1 wherein said charge hydrocarbon is a straight run or cracked naphtha and mixtures thereof.

4. The process of treating a charge hydrocarbon containing undesired aromatic components, sulfur and nitrogen compounds, as claimed in claim 1 wherein said charge hydrocarbon is a straight run or cracked middle distillate and mixtures thereof.

5. The process of treating a charge hydrocarbon containing undesired aromatic components, sulfur and nitrogen compounds, as claimed in claim 1 wherein said charge hydrocarbon is a straight run or cracked gas oil and mixtures thereof.

6. The process of treating a charge hydrocarbon containing undesired aromatic components, sulfur and nitrogen compounds, as claimed in claim 1 wherein said charge hydrocarbon is a diesel fuel or a jet fuel and mixtures thereof.

7. The process of treating a charge hydrocarbon containing undesired aromatic components, sulfur and nitrogen compounds, as claimed in claim 1 wherein said charge hydrocarbon is a kerosene or a heavy naphtha and mixtures thereof.

8. The process of treating a charge hydrocarbon containing undesired aromatic components, sulfur and nitrogen compounds, as claimed in claim 1 wherein said charge hydrocarbon is a hydrocracker feed or a fluid catalytic cracker feed.

9. The process of treating a charge hydrocarbon containing undesired aromatic components, sulfur and nitrogen compounds, as claimed in claim 1 wherein said hydrotreating conditions include a temperature of 300° C.–410° C., pressure of 400–2500 psig, a liquid hourly space velocity LHSV of 0.5–4 and hydrogen feed rate of 1000–6000 SCFB.

10. The process of claim 1 wherein the carbon supported catalyst contains 2 to 12% by weight nickel, 10 to 45% by weight tungsten and 0.01 to 5% by weight zinc.

11. The process of claim 1 wherein the carbon supported catalyst contains 20 to 40% by weight tungsten and, optionally, 10 to 15% chromium and/or molybdenum.

12. The process of claim 1 wherein the carbon supported catalyst consists essentially of 2 to 12% by weight nickel, and optionally 1 to 12% by weight cobalt and/or iron.

13. The process of claim 1 wherein the carbon supported catalyst contains 2 to 5% by weight zinc.

14. The process of claim 1 wherein the carbon supported catalyst contains additional promoters selected from the group consisting of 0.01 to 4% by weight boron, 0.01 to 4% by weight phosphorus, and 0.01 to 4% by weight fluorine, or mixtures thereof.

15. The process of treating a charge hydrocarbon containing undesired aromatic components, sulfur and nitrogen compounds, as claimed in claim 1 wherein said carbon support is characterized by a BET surface area of at least about 600 m$^2$/g, a total pore volume for nitrogen of at least about 0.3 cc/g, and an average pore diameter, calculated from nitrogen physisorption of at least about 12 Angstroms.

16. The process of claim 1 wherein the carbon support is characterized by having 20 to 80% of its pore volume in pores of 20–500 Angstroms diameter.

17. The process of claim 1 wherein the carbon support is characterized by a BET surface area of 600–1600 m$^2$/g.

18. The process of claim 1 wherein the carbon support is characterized by an average pore diameter of 16–50 Angstroms.

19. The process of claim 1 for treating a charge hydrocarbon containing undesired aromatic components, sulfur and nitrogen compounds, wherein said carbon support is selected from a carbon powder, granule, sphere, pellet, monolith, and extrudate.

20. A process for treating a charge hydrocarbon oil containing undesired aromatic components, sulfur and nitrogen compounds, which also exhibits substantial hydrodesulfurization, which comprises:

maintaining a bed of a sulfided catalyst comprising 2 to 12% by weight of one or more non-noble Group VIII metals; and from 10 to 45% by weight of tungsten and/or from 5 to 18% by weight of molybdenum or chromium, and 0.1 to 5% by weight of zinc, on an activated carbon support, wherein the activated carbon support is characterized by a surface area of 600 to 2000 m$^2$/g, a pore volume for nitrogen of at least 0.3 cc/g and an average pore diameter of 12 to 100 Angstroms;

passing a charge hydrocarbon feed in the presence of a gas selected from pure hydrogen and a gas mixture comprising greater than 60% by volume hydrogen into contact with said catalyst at hydrotreating conditions, thereby effecting hydrogenation, hydrodearomatization, hydrodesulfurization and hydrodenitrogenation of said charge hydrocarbon feed containing undesired aromatic components, sulfur and nitrogen compounds, and forming a product stream of hydrocarbon containing a lesser concentration of undesired aromatic components, sulfur and nitrogen; and recovering said product stream of hydrocarbon containing a lesser concentration of undesired aromatic components, sulfur and nitrogen.

21. A process for simultaneous hydrogenation, hydrodesulfurization, hydrodenitrogenation and hydrodearomatization of a charge hydrocarbon oil, which comprises:

maintaining a bed of a sulfided catalyst comprising 2 to 12% by weight of one or more non-noble Group VIII metals; and from 10 to 45% by weight of tungsten and/or from 5 to 18% by weight of molybdenum or chromium, and 0.1 to 5% by weight of zinc, on an activated carbon support, wherein the activated carbon support is characterized by a surface area of 600 to 2000 m$^2$/g, a pore volume for nitrogen of at least 0.3 cc/g and an average pore diameter of 12 to 100 Angstroms;

passing a charge hydrocarbon feed in the presence of a gas selected from pure hydrogen and a gas mixture comprising greater than 60% by volume hydrogen into contact with said catalyst at hydrotreating conditions, thereby effecting hydrogenation, hydrodearomatization, hydrodesulfurization and hydrodenitrogenation of said charge hydrocarbon feed, and forming a product stream of hydrocarbon containing a lesser concentration of undesired aromatic components, sulfur and nitrogen; and recovering said product stream of hydrocarbon containing a lesser concentration of undesired aromatic components, sulfur and nitrogen.

* * * * *